(12) United States Patent
Justl

(10) Patent No.: US 9,103,454 B2
(45) Date of Patent: Aug. 11, 2015

(54) ONE-WAY SEAL FOR PROCESS VALVES

(71) Applicant: KRONES AG, Neutraubling (DE)

(72) Inventor: Johann Justl, Neutraubling (DE)

(73) Assignee: KRONES AG, Neutraubling (DE)

( * ) Notice: Subject to any disclaimer, the term of this patent is extended or adjusted under 35 U.S.C. 154(b) by 211 days.

(21) Appl. No.: 13/839,184

(22) Filed: Mar. 15, 2013

(65) Prior Publication Data

US 2013/0240071 A1 Sep. 19, 2013

(30) Foreign Application Priority Data

Mar. 15, 2012 (DE) .......................... 10 2012 204 071

(51) Int. Cl.
*F16K 1/44* (2006.01)
*F16K 1/46* (2006.01)
*F16K 15/14* (2006.01)

(52) U.S. Cl.
CPC . *F16K 1/44* (2013.01); *F16K 1/446* (2013.01); *F16K 1/46* (2013.01); *F16K 15/142* (2013.01); *Y10T 137/87981* (2015.04)

(58) Field of Classification Search
CPC ............. F16K 1/44; F16K 1/446; F16K 1/46; F16K 15/142
USPC .......... 137/614.11, 614.17, 614.18, 240, 312; 251/332, 333, 356, 357, 358
See application file for complete search history.

(56) References Cited

U.S. PATENT DOCUMENTS

| 1,953,007 | A | | 3/1934 | Farmer |
| 2,306,012 | A | | 12/1942 | Campbell |
| 4,687,015 | A | * | 8/1987 | Mieth ........................... 137/238 |
| 4,856,551 | A | | 8/1989 | Brakelmann |
| 4,915,355 | A | * | 4/1990 | Fort ............................... 251/357 |
| 5,085,241 | A | * | 2/1992 | Mieth ............................. 137/1 |
| 5,575,305 | A | * | 11/1996 | Mieth ........................ 137/15.04 |
| 5,806,554 | A | * | 9/1998 | Mieth ........................... 137/240 |
| 6,178,986 | B1 | * | 1/2001 | Burmester ................... 137/240 |
| 6,230,736 | B1 | * | 5/2001 | Scheible et al. .............. 137/312 |
| 6,517,076 | B1 | * | 2/2003 | Menage ........................ 277/314 |
| 2007/0007474 | A1 | * | 1/2007 | Hayashi et al. ................. 251/54 |

(Continued)

FOREIGN PATENT DOCUMENTS

DE 19842603 A1 4/2000
DE 102006014846 A1 10/2007

(Continued)

OTHER PUBLICATIONS

European Search Report for EP13158704 dated Jul. 12, 2013.

(Continued)

*Primary Examiner* — Craig Schneider
*Assistant Examiner* — Kevin Barss
(74) *Attorney, Agent, or Firm* — Marshall, Gerstein & Borun, LLP

(57) ABSTRACT

The disclosure relates to a process valve for a media flow path, particularly for use in the beverage industry or pharmaceutical, chemical and food industry, including at least one valve disk, at least one primary seal lying on the valve disk, at least one secondary seal, and at least one hollow space bounded by at least one primary seal and at least one secondary seal having at least one conically tapered groove for holding the secondary seal. The secondary seal is incorporated in such a manner that it seals on only one side and is permeable to media that flow out of the hollow space.

24 Claims, 3 Drawing Sheets

(56) References Cited

U.S. PATENT DOCUMENTS

| | | | |
|---|---|---|---|
| 2009/0121443 A1* | 5/2009 | Kanagae | 277/584 |
| 2010/0072411 A1 | 3/2010 | Norton | |
| 2011/0100492 A1* | 5/2011 | Burmester et al. | 137/625.69 |

FOREIGN PATENT DOCUMENTS

| | | |
|---|---|---|
| DE | 102010003445 A1 | 10/2011 |
| DE | 102010030299 A1 | 12/2011 |
| DE | 102010030300 A1 | 12/2011 |
| EP | 0545846 A1 | 6/1993 |
| GB | 344686 A | 3/1931 |

OTHER PUBLICATIONS

Search Report in DE Application No. 10 2012 204 071.4 dated Oct. 19, 2012, 5 Pages.

* cited by examiner

ONE-WAY SEAL FOR PROCESS VALVES

FIELD OF THE INVENTION

The invention relates to a process valve of the type specified in the introductory portion of Patent Claim 1.

BACKGROUND

At present, hollow spaces in process valves, said hollow spaces bordering on seals, particularly as the process valves are used in media flow paths in the food/beverage filling industry, but also in the pharmaceutical and chemical industry, are hermetically sealed, which means that in the case of a proper seal, media flows, such as e.g., product or food flows, do not penetrate into the process valve, nor do any media present in the aforementioned hollow spaces escape out of the process valve and penetrate into the surroundings or into the media flow paths conducted by the process valve.

Among other reasons, one reason for the presence of hollow spaces in process valves, such as, e.g., gaps, that border on seals, is, e.g., the fact that valve disks are often multi-piece and e.g., gaps or hollow spaces can form between valve disk parts that are screwed together. One reason for this multi-piece construction of valve disks is constituted by the fact that this simplifies, e.g., the assembly of ring seals into the retaining groove of the valve disk because the ring seal has to be less strongly deformed during the integration into the retaining groove. Other reasons for the hollow spaces in the valve disk can be due to screwed connections, e.g., of valve disk to valve stem or other process valve components, that are installed for maintenance reasons.

As mentioned, as a rule, the described hollow spaces in process valves are sealed hermetically by sealing elements that seal on both sides.

Described in DE102010003445A1 is, e.g., a process valve as a seat valve having an internal screwed connection of valve parts that seals the interior of the seat valve, particularly the area between the disk parts that borders on the seal, hermetically to the outside.

DE102010030300A1 (see particularly FIG. 1) describes a process valve as a double seat valve having a multi-piece upper valve disk and a multi-piece lower valve disk in which any hollow spaces or gaps that exist between the screwed-together valve disk parts and that border on seals are sealed on both sides with respect to the inside and outside.

Detrimental in the known process valves is, among others factors, that when there are temperature changes, unwanted pressures can form within hermetically chambered hollow spaces that border on the process valve primary seal, which can damage the process valve primary seal or interfere with the function of the same. Moreover, the detection of leakages in the event of a defective primary seal or leaks in the fixing points of the primary seal is hindered.

An object of the present disclosure is consequently to improve process valves, particularly process valves for use in the beverage filling industry, particularly with respect to the sealing behaviour and maintainability.

SUMMARY

In some arrangements, this object is achieved according to the present disclosure by means of a process valve in accordance with Claim 1.

Advantageous embodiments and further developments are the subject of the dependent claims.

In some arrangements, a process valve according to the disclosure in a media flow path, particularly for use in the beverage filling industry, can thereby contain at least one valve disk, at least one primary seal lying on the valve disk, at least one secondary seal, at least one hollow space bounded by at least one primary seal and at least one secondary seal and having at least one conically tapered groove for holding a secondary seal, and it can be distinguished by the fact that the secondary seal is incorporated in such a manner that it seals on only one side and is permeable to media that flow out of the hollow space.

In other words, the described secondary seal is consequently distinguished by the fact that the secondary seal can seal against media that flow against the secondary seal in the tapering direction of the conically tapered groove, while the secondary seal can allow media through that flow against the secondary seal in the direction of the broadening direction of the conically tapered groove.

The secondary seal can thereby be provided in such a manner that it can be leaky on one side only if a pressure difference of 0.01, 0.1, 0.5 or 1 bar between the pressure in the interior of the hollow space, which can be bounded by a primary seal and a secondary seal, and the pressure in the space outside of the hollow space bounded by the secondary seal is exceeded, and media can flow out of the hollow space via the secondary seal.

One advantage that this has is that leakages of a primary valve can be detected more quickly and more easily, because the medium infiltrating behind the leaky primary seal can escape in an easily visible manner into the surroundings or, e.g., into a leakage collecting space via the one-way secondary seal.

Moreover, pressure changes, e.g., due to temperature changes, between a hollow space bounded by a primary seal and a secondary seal can advantageously be compensated for and consequently unnecessary thermal and mechanical loads on a primary seal, which can lead to damage or impaired function of the main seal, can be minimized.

Furthermore, it can simultaneously advantageously be possible, e.g., during cleaning processes, e.g., to reduce or avoid the risk of the penetration of cleaning liquid or other liquids or unwanted media into the hollow space between the secondary seal and primary seal.

In addition, a one-way secondary seal can be provided in such a manner that, on the side of its sealing effect, it can withstand maximum pressures up to 20, 30, or 40 bar, at least for a short time, i.e., for at least for 1, 5, or 10 s. This has the advantage that the secondary seal can remain functional even in the event of pressure hammers.

Apart from that, the term hollow space should be taken to mean, for example, among other meanings, clearances and/or gaps between different process valve components, as well as hollow spaces and/or bores within the same process valve component.

Likewise, for example, a conically tapered groove for holding a secondary seal can be formed by component walls or component wall parts of different process valve components, or from component walls or component wall parts of the same process valve component.

The primary seal(s) of the process valve can thereby be executed as radial or axial seat seal(s) and/or as seat seal(s) with simultaneous radial and axial sealing effects.

Furthermore, it is noted that in the following the term secondary seal is always to be understood as a one-way secondary seal.

A secondary seal can be incorporated into a conically tapered groove with an initial tension, whereby the aperture angle of the conically tapered groove can lie between 15° and 45°.

The pressure generated by the media flowing against the secondary seal in the direction of the broadening direction of the conically tapered groove can thereby press or deform the secondary seal in the direction of the broadening direction of the conically tapered groove, so that the secondary seal can be leaky in the direction of the broadening direction of the conically tapered groove.

The initial tension of the secondary seal can thereby pull the secondary seal into the groove bevel or groove in the tapering direction of the conically tapered groove or it can hold the secondary seal in the same. This has the advantage that the secondary seal is not carried away by media that flow in the direction of the broadening direction of the conically tapered groove and/or the secondary seal does not detach from the conically tapered groove.

The secondary seal can, however, also be incorporated into the conically tapered groove without an initial tension, and the aperture angle of the conically tapered groove can lie between 8° and 30°, preferably between 12° and 18°. The secondary seal can, however, thereby be incorporated such that it is pressed into the groove or is pressed between the groove walls. The pressing can be generated, among other ways, by, e.g., the intrinsic weight of the component element, e.g., a valve disk part, lying above the secondary seal as seen in the direction of gravity, or also by screwing together the components that form the groove.

In the case of media flowing out of the hollow space or in the direction of the tapering direction of the conical groove, the secondary seal seals and is pressed into the tapering groove. In contrast, if a medium flows against the secondary seal from the direction of the broadening direction of the conically tapered groove, the secondary seal can, due to the pressure of the flowing medium, push further in the direction of the broadening direction of the conically tapered groove and consequently, due to a partial loss of the pressing, the secondary seal can become permeable to the aforementioned medium that is flowing out of the hollow space.

The secondary seal can be provided in such a manner that its deformation under the effect of pressure, e.g., pressure differences of up to 0.1, 1 or 10 bar between the pressure in the interior of the hollow space, which can be bounded by a primary seal and a secondary seal, and the pressure in the space outside of the hollow space bounded by the secondary seal, generated, e.g., by the media flowing out of the hollow space, does not exceed half the mean cord thickness of the secondary seal.

This hinders advantageously the secondary seal from being carried along by the media flowing out of the hollow space or in the direction of the broadening direction of the conically tapered groove and/or from becoming detached from the conically tapered groove.

The secondary seal can be executed as a contour ring, for example, as an O-ring.

The geometric form of the secondary seal can be a body of rotation, e.g., a torus, with a preferably circular or elliptical cross-section. Other cross-section geometric forms are also conceivable for the secondary seal, however, such as, e.g., trapezoidal cross-sections.

The secondary seal can be made of, for example, an elastomer, e.g., a terpolymer elastomer such as EPDM (ethylene propylene diene monomer), or of a thermoplast, e.g., PTFE (polytetrafluoroethylene), and it can have Shore hardnesses between 50 and 100, preferably between 60 and 80.

The stiffness or Shore hardness of the secondary seal can prevent or hinder the secondary seal from buckling or being carried along with media flowing in the direction of the broadening direction of the conically tapered groove.

The secondary seal can be used in a process valve which is executed as a single seat valve with a one-piece or multi-piece valve disk.

In the case of a process valve executed as a single seat valve with a one-piece or multi-piece valve disk, a hollow space bounded by a primary seal and a secondary seal can extend partially up to the clearance between a valve stem and a valve stem housing, and connected to the secondary seal boundary, which is facing away from the flow direction of the media from the direction of the hollow space, can be an opening, through which the media flowing out of the one-way secondary seal from the direction of the hollow space interior can escape into the surroundings or into a process valve housing part, e.g., a leakage collecting space.

In this way, slightly leaky primary seals in single seat valves can be detected advantageously, because in the event of leaky primary seals, escaping leakages can be detected more easily. On the other hand, it is simultaneously possible advantageously to prevent, e.g., during cleaning processes, e.g., cleaning liquid from penetrating into the hollow space between secondary seal and primary seal.

It is thereby noted that a valve stem can be executed in a process valve with or without a balance.

According to the disclosure, a secondary seal can also be executed in a process valve as a double seat valve with a first one-piece or multi-piece valve disk and a second one-piece or multi-piece valve disk.

It is thereby possible, e.g., between the first valve disk and the second valve disk, for there to be an intermediate hollow space into which media flowing against the process valve can penetrate through the secondary seal of the upper valve disk and/or through the secondary seal of the lower valve disk and/or in the case of leaky primary seals, through the primary seal of the upper and/or lower valve disk, and collect.

This intermediate hollow space can consequently, e.g., in the closed position, advantageously serve as a safety space or leakage space.

The intermediate hollow space can additionally have a run-off via which the media that have penetrated into the clearance can flow out or be suctioned off.

In the case of seat lifting or lifting of the first or second valve disk, it is advantageously possible for no medium to penetrate into the valve disk, i.e., e.g., into a hollow space bounded by a secondary seal and a primary seal within a valve disk, and consequently, e.g., to avoid the penetration of cleaning liquid, other liquids or unwanted media.

By way of example for an improved understanding and for illustration of aspects of the disclosure, enclosed figures depict:

DETAILED DESCRIPTION

Figure 1:
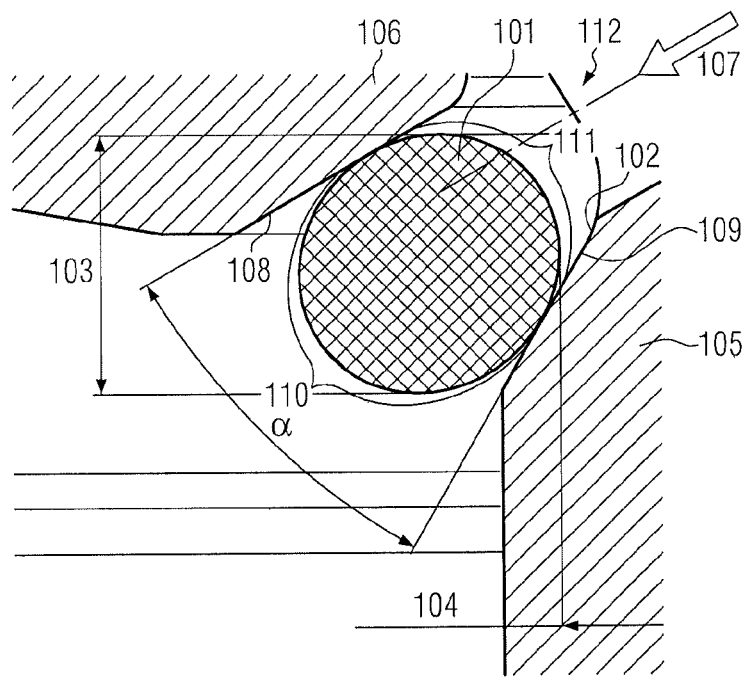
FIG. 1 is an enlarged detail cross-sectional view of a one-way secondary seal with initial tension.

FIG. 1 shows, by way of example, how a one-way secondary seal 101 can be incorporated into a conically tapered groove 102 with an initial tension. The groove walls 108 and 109 can thereby be formed by the walls or parts of the walls of components/component elements 106 and 105. The component elements 106 and 105 can thereby belong to the same component or to different components. The aperture angle α of the conically tapered groove 102 can lie, for a secondary seal 101 incorporated with an initial tension, for example, between 15° and 45°.

The hollow space 112 lying between the primary seal (not shown) and the secondary seal 101 can be bounded on the secondary seal 101 by the part of the secondary seal 101 indicated as the secondary seal boundary 111 (also nameable as the inner secondary seal boundary). The part of the secondary seal 101 which faces away from the direction 107 from which the media can flow out of the hollow space 112, is marked here as secondary seal boundary 110 (also nameable as the outer secondary seal boundary).

In the case of a pressure difference of at least 0.01, 0.1, 0.5, or 1 bar between a pressure that is present on the inner secondary seal boundary 111 and a pressure that is present on the outer secondary seal boundary 110, the secondary seal 101 can, in a one-sided manner on the side of the inner secondary seal boundary 111, be permeable to media that flow against the secondary seal 101 from the hollow space 112.

The secondary seal 101 can be provided in such a manner that its deformation under the effect of pressure, e.g., pressure differences of up to 0.1, 1, or 10 bar between the pressure in the interior of the hollow space, which can be bounded by a primary seal and a secondary seal, and the pressure in the space outside of the hollow space bounded by the secondary seal, generated, e.g., by the media flowing out of the hollow space, does not exceed half the mean cord thickness 103 of the secondary seal 101.

The initial tension and/or the stiffness or Shore hardness of the secondary seal 101 can also prevent the secondary seal from buckling or being carried along in the flow direction 107 of a medium flowing out of the hollow space 112 up to pressures of a maximum of 10, 20, or 40 bar.

Figure 2:
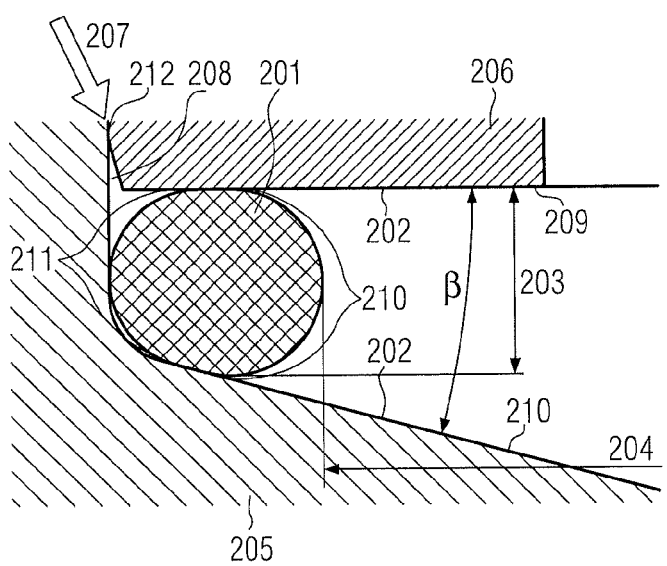
FIG. 2 is an enlarged detail cross-sectional view of a one-way secondary seal without initial tension.

FIG. 2 shows, by way of example, a secondary seal 201 that can be incorporated into a conically tapered groove 202, spanned between the groove walls 209 and 210, without an initial tension. The hollow space 212 bounded by the secondary seal 201 and the primary seal (not shown) can open, e.g., into a gap 208 between components 206 and 205. If there is pressure present on the outer secondary seal boundary 210, meaning the part of the secondary seal 201 that faces away from the direction 207 from which the media can flow out of the hollow space 212 or gap 208, the secondary seal 201 can be pressed in the tapering direction of the groove 202 and consequently seal against media which flow against the outer secondary seal boundary 210.

The secondary seal 201 can, however, also be incorporated such that it is already pressed in, e.g., due to the intrinsic weight of a component which lies above the secondary seal 201 when seen in the direction of gravity, and which, for example, presses the groove wall/groove top 209 together with the secondary seal 201 against the groove wall/groove bottom 210, or by means of screwing and thus pressing together the groove walls 209 and 210 and which can press the enclosed secondary seal 201.

The aperture angle β of the conically tapered groove for a secondary seal incorporated without an initial tension can thereby lie between 8° and 30°, preferably between 12° and 18°.

If now a medium flows out of the hollow space 212 or out of the gap 208, e.g., from the direction 207, against the secondary seal 201 or the inner secondary seal boundary 211, the secondary seal, due to the pressure of the flowing medium, can slide farther in the direction of the broadening direction of the conically tapered groove and consequently become permeable to the aforementioned medium flowing out of the hollow space 212 due to a partial loss of the pressing.

The secondary seal 201 can be provided in such a manner that its deformation under the effect of pressure, e.g., pressure differences of from 0.1 to 10 bar between the pressure in the interior of the hollow space 212, which can be bounded by a primary seal and a secondary seal, and the pressure in the space outside of the hollow space 212 bounded by the secondary seal 201, generated, e.g., by the media flowing out of the hollow space 212, does not exceed half the mean cord thickness 203 of the secondary seal 201.

It is also possible for the stiffness or Shore hardness of the secondary seal 201 to prevent the secondary seal from buckling or being carried along in the flow direction 207 of a medium flowing out of the hollow space 212 or the gap 208 up to pressures of a maximum of 20, 30, or 50 bar.

Figure 3:
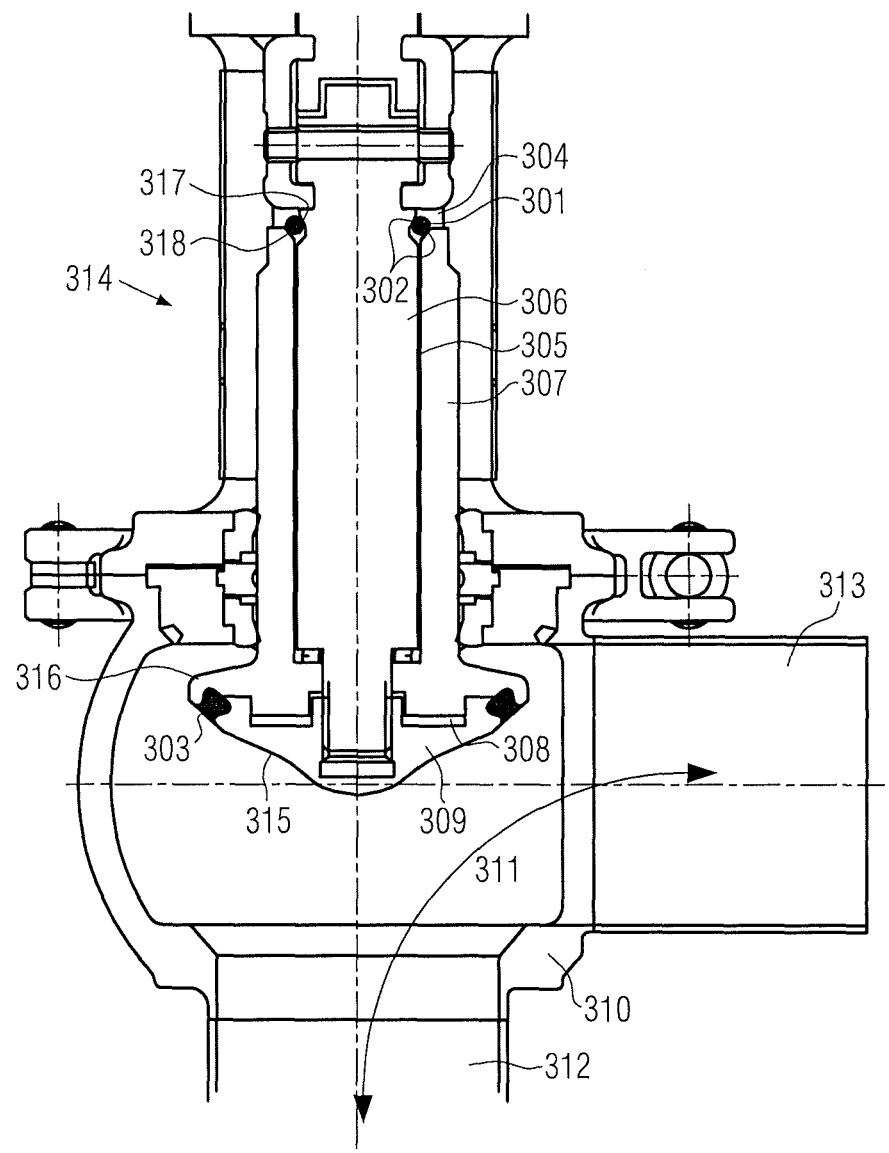
FIG. 3 illustrates a single seat valve.

FIG. 3 depicts, by way of example, a process valve as a single seat valve 314 which can have a two-piece valve disk 309 with a first valve disk part 315 and a second valve disk part 316.

A primary seal 303 and a secondary seal 301 can bound a hollow space 308 that can be located between the valve disk parts 315 and 316, and can also enclose at least partially the clearance 305 between the valve stem 306 and valve stem housing 307. The valve stem 306 can be executed with (as shown) or without a balance.

Media flowing out of the hollow space 308 that, for example, penetrate into the hollow space 308 via a leaky point of the primary seal 303 can escape into the surroundings or into a process valve housing part, e.g., a leakage collecting space, through the secondary seal 301 and, e.g., through an opening 304 connected to the secondary seal and located between the valve stem 306 and the valve stem housing 307.

The conically tapered groove 302 for holding the secondary seal 301 can thereby be formed, e.g., by a part 317 of the valve stem 306 and a part 318 of the valve stem housing 307. The secondary seal 301 can thereby be incorporated into the conically tapered groove 302 with an initial tension and/or by being pressed in.

In this way, slightly leaky primary seals in single seat valves can be detected advantageously, because in the event of leaky primary seals, leakages can be detected more easily. On the other hand, it is simultaneously and advantageously possible to prevent, e.g., during cleaning processes of the valve disk 309, the valve stem 306, or the valve stem housing 307, cleaning liquid from penetrating into the hollow space 308 between the secondary seal 301 and the primary seal 303.

Apart from that, FIG. 3 depicts, by way of example, a single seat valve in the open position, in which, e.g., the media flow 311 can flow between the pipes 312 and 313. The seat 310 of the single seat valve can lie, for example, on the pipe 312.

Figure 4:
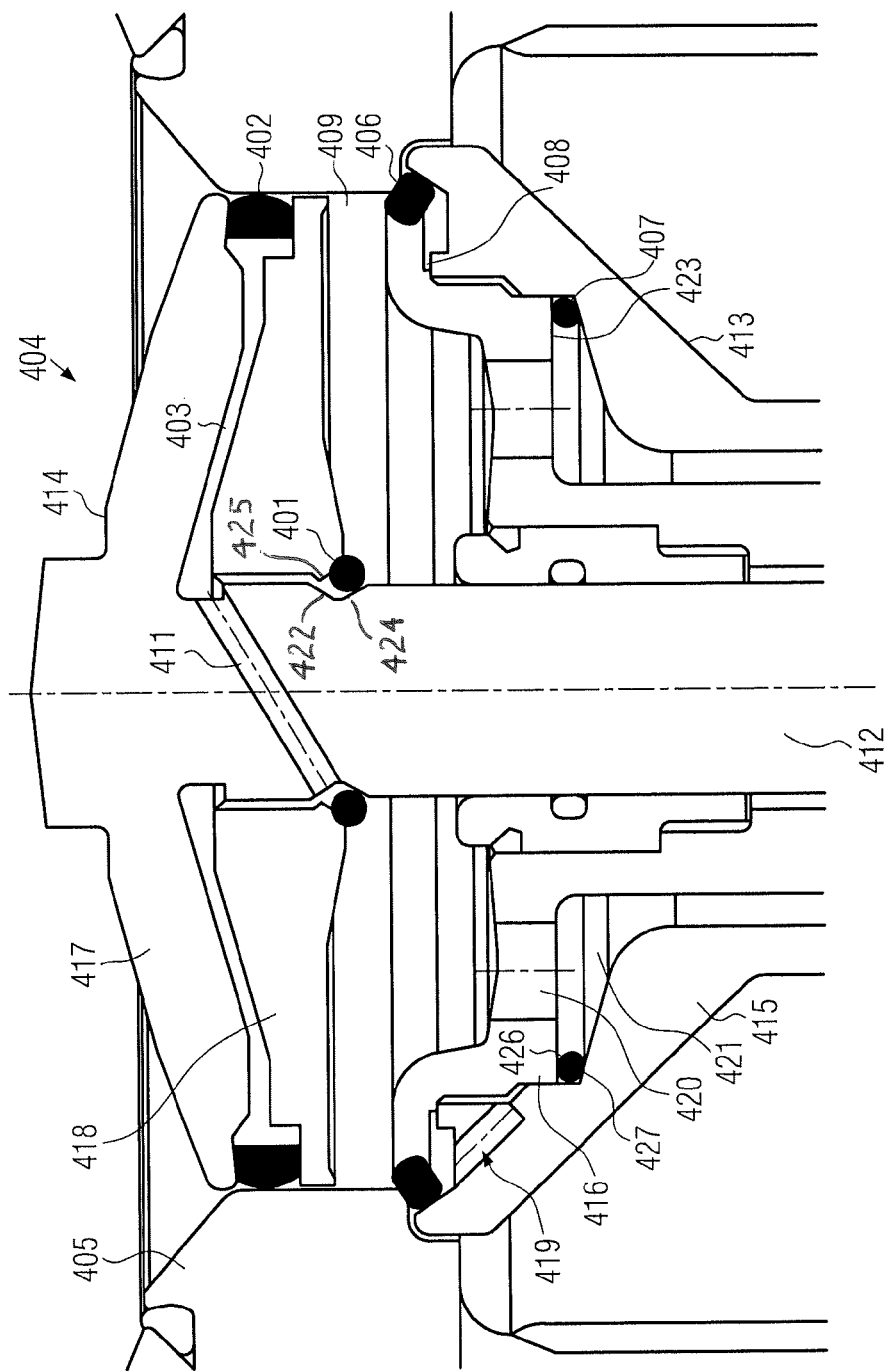
FIG. 4 illustrates a double valve

FIG. 4 depicts, by way of example, a process valve as a double seat valve 404. A double seat valve 404 can thereby have a first valve disk 414 and a second valve disk 413.

The valve disks 413, 414 can be multi-piece. E.g., the first valve disk 414 can consequently contain a first valve disk part 417 and a second valve disk part 418, and likewise the second valve disk 413 can contain a first valve disk part 416 and a second valve disk part 415. It is thereby conceivable that the valve disk parts of a valve disk can be screwed together.

The first valve disk 414 can have a hollow space 403 that can be bounded by a primary seal 402, which can be executed so as to have, e.g., a radial effect, and a secondary seal 401.

Parts of the hollow space 403 can thereby be executed as bores, e.g. bore 411, which advantageously can conduct media possibly penetrating through a leaky point of the primary seal 402 better to the secondary seal 401, from which point it can escape again out of the hollow space 403. The secondary seal 401 can thereby be incorporated into the conically tapered groove 422 with an initial tension and/or by being pressed in. The groove walls 424 and 425 of the groove 422 can thereby be formed, e.g., by a part of the valve stem 412 and a part of the second valve disk part 418. It is also possible, however, that the groove walls 424, 425 are formed by the same component, e.g., valve disk part 418.

The second valve disk 413 can also have a hollow space 408 that can be bounded by a primary seal 406, which can be executed so as to have, e.g., an axial and/or radial effect, and a secondary seal 407. Parts of the hollow space 408 can thereby be executed as bores, e.g., bore 419, which advantageously can conduct media possibly penetrating through a leaky point of the primary seal 406 better to the secondary seal 407, from which point they can escape again out of the hollow space 408 and, for example, be drawn off via a clearance 421 between the first 416 and the second 415 valve disk part of the second valve disk 413.

The secondary seal 407 can thereby be incorporated into the conically tapered groove 423 with an initial tension and/or by being pressed in. The groove walls 426 and 427 of the groove 423 can thereby be formed, e.g., by a part of the first valve disk part 416 and a part of the second valve disk part 415.

Between the first valve disk 414 and the second valve disk 413 it is possible for there to be an intermediate hollow space 409, into which, e.g., in the closed position (as shown) of the double seat valve 404, in the event of a leaky primary seal 402 and/or leaky primary seal 406, a medium can penetrate into the intermediate hollow space 409.

In the event of, e.g., a leaky primary seal 402, a medium can thereby first penetrate into the hollow space 403 and escape into the intermediate hollow space 409 via the secondary seal 401. In the closed position of the double seat valve 404 in the event of leaky primary seal 402, it is also possible that, e.g., a medium can penetrate into the intermediate hollow space through a gap between the first valve disk and seat 405 of the double seat valve 404.

The intermediate hollow space 409 can consequently advantageously serve as a safety space for catching leakage.

A medium can flow out of or be suctioned out of the intermediate hollow space 409 through an opening 420 in the second valve disk 413, or in the first valve disk part 416 of the second valve disk 413, to which can be connected, for example, a clearance 421 between the first 416 and the second 415 valve disk part of the second valve disk 413.

In the open position of the double seat valve 404, e.g., when switching or, for example, for a flush cleaning, and intact primary seals 402 and 406, the secondary seals 401 and 407 prevent a medium from being able to penetrate into the hollow spaces 403 and/or 408.

The described one-way secondary seal can, in addition to the process valves cited above by way of example as single seat valve and double seat valve, also be used, e.g., in slanted seat valves, shuttle valves, tank bottom valves or double seal valves, or in process valves with valve disks, particularly with multi-piece valve disks.

What is claimed is:

1. A process valve for a media flow path for use in the beverage industry or pharmaceutical, chemical and food industry, comprising:

at least one valve disk;
 at least one primary seal lying on the valve disk;
 at least one secondary seal;
 at least one hollow space bounded by at least one primary seal and by at least one secondary seal; and
 at least one conically tapered groove for holding a secondary seal, wherein the secondary seal is incorporated in such a manner that it seals on only one side and is permeable to media that flow out of the hollow space.

2. A process valve according to claim 1, wherein the primary seal is executed as a radial seal.

3. A process valve according to claim 1, wherein the secondary seal is incorporated into the conically tapered groove with initial tension and an aperture angle of the conically tapered groove lies between 15° and 45°.

4. A process valve according to claim 1, wherein the secondary seal is incorporated into the conically tapered groove without initial tension and an aperture angle of the conically tapered groove lies between 8° and 30°.

5. A process valve according to claim 4, wherein the aperture angle of the conically tapered groove lies between 12° and 18°.

6. A process valve according to claim 1, wherein the secondary seal is a contour ring.

7. A process valve according to claim 6, wherein the secondary seal is an O-ring.

8. A process valve according to claim 1, wherein the secondary seal is provided in such a manner that its deformation, under the effect of pressure differences of up to 10 bar between a first pressure in the interior of the hollow space that can be bounded by a primary seal and a secondary seal and a second pressure in a second space outside of the hollow space bounded by the secondary seal, does not exceed half a mean cord thickness of the secondary seal.

9. A process valve according to claim 1, wherein the process valve is a single seat valve having a multi-piece valve disk.

10. A process valve according to claim 9, wherein the hollow space extends partially up to a clearance between a valve stem and a valve stem housing, and connected to a secondary seal boundary, which is facing away from a flow direction of media from the direction of the hollow space, is an opening through which media flowing out of the secondary seal from the direction of the hollow space can escape into the surroundings or into a process valve housing part.

11. A process valve according to claim 10, wherein the process valve housing part comprises a leakage collecting space.

12. A process valve according to claim 1, wherein the process valve is a double seat valve having a first valve disk and a second valve disk.

13. A process valve according to claim 12, wherein at least one of the first valve disk and the second valve disk is a one-piece valve disk.

14. A process valve according to claim 12, wherein an intermediate hollow space is located between the first valve disk and the second valve disk, and wherein media flowing against the process valve can penetrate and collect into the intermediate hollow space via at least one or more of a first secondary seal of the first valve disk, a second secondary seal of the second valve disk, a first primary seal of the first disk, and a second primary seal of the second valve disk.

15. A process valve according to claim 14, wherein the intermediate hollow space has a run-off via which media that has penetrated into the intermediate hollow space can exit the hollow space.

16. A process valve according to claim 14, wherein media flowing against the process valve can penetrate and collect into the intermediate hollow space via the first primary seal or the-second primary seal in the event of leaky first or second primary seals, respectively.

17. A process valve according to claim 1, wherein the secondary seal is made of at least one of an elastomer and a thermoplast, and wherein the secondary seal has Shore hardnesses between 50 and 100.

18. A process valve according to claim 17, wherein the elastomer comprises a terpolymer elastomer.

19. A process valve according to claim 18, wherein the terpolymer elastomer comprises ethylene propylene diene monomer, including polytetrafluoroethylene.

20. A process valve according to claim 17, wherein the secondary seal has Shore hardnesses between 60 and 80.

21. A process valve according to claim 1, wherein the primary seal is executed as an axial seat seal.

22. A process valve according to claim 1, wherein the primary seal is executed as a seat seal with simultaneous radial and axial sealing effect.

23. A process valve according to claim 1, wherein the process valve is a single seat valve having one-piece valve disk.

24. A process valve according to claim 12, wherein at least one of the first valve disk and the second valve disk is a multi-piece valve disk.

* * * * *